United States Patent
Ramsay et al.

(10) Patent No.: US 6,695,480 B1
(45) Date of Patent: Feb. 24, 2004

(54) OPPOSED FLOW SEAL/BEARING ASSEMBLY

(75) Inventors: Thomas W. Ramsay, Ontario (CA); Douglas T. Bridge, Stoneham, MA (US)

(73) Assignee: A.W. Chesterton Co., Stoneham, MA (US)

(*) Notice: Subject to any disclaimer, the term of this patent is extended or adjusted under 35 U.S.C. 154(b) by 0 days.

(21) Appl. No.: 10/030,828

(22) PCT Filed: Jul. 13, 2000

(86) PCT No.: PCT/US00/19092
§ 371 (c)(1), (2), (4) Date: Jan. 11, 2002

(87) PCT Pub. No.: WO01/04503
PCT Pub. Date: Jan. 18, 2001

Related U.S. Application Data (60) Provisional application No. 60/144,410, filed on Jul. 13, 1999.

(51) Int. Cl.$^7$ ............... F16C 17/10; F04D 29/06
(52) U.S. Cl. ............ 384/110; 384/112; 384/130; 384/292
(58) Field of Search ............... 384/100, 110, 384/107, 112, 130, 147, 276, 280, 286, 287, 288, 290, 291, 292, 322, 368, 397, 398, 414

(56) References Cited

U.S. PATENT DOCUMENTS

| | | | | |
|---|---|---|---|---|
| 640,059 | A | * 12/1899 | Whitney | 384/569 |
| 1,923,597 | A | 8/1933 | Walker | |
| 3,674,355 | A | * 7/1972 | Yearout et al. | 384/110 |
| 4,010,960 | A | 3/1977 | Martin | |
| 4,043,612 | A | 8/1977 | Orcutt | |
| 4,462,644 | A | 7/1984 | Conner | |
| 4,614,445 | A | 9/1986 | Gerkema et al. | |
| 5,142,173 | A | * 8/1992 | Konno et al. | 310/67 R |
| 5,246,294 | A | * 9/1993 | Pan | 384/119 |
| 5,370,463 | A | * 12/1994 | Asada et al. | 384/113 |
| 5,707,154 | A | * 1/1998 | Ichiyama | 384/107 |
| 5,827,042 | A | 10/1998 | Ramsay | |
| 5,921,731 | A | * 7/1999 | Chandrasekar | 409/231 |
| 6,210,103 | B1 | 4/2001 | Ramsay | |

* cited by examiner

*Primary Examiner*—David A. Bucci
*Assistant Examiner*—Julie K. Smith
(74) *Attorney, Agent, or Firm*—Marshall, Gerstein & Borun LLP (57) ABSTRACT

A seal and bearing apparatus for a rotating shaft including a pair of sleeves with two spiral grooves (14) on an inclined surface (16).

4 Claims, 6 Drawing Sheets

OPPOSED FLOW SEAL/BEARING ASSEMBLY

This application claims the benefit of Provisional application Ser. No. 60/144,410, filed Jul. 13, 1999.

BACKGROUND OF THE INVENTION

This invention relates to a development of the technologies described in patent publication WO 96/35457 ("RAMSAY") published Dec. 28, 1995, and based on PCT/CA95/00362. The present invention relates to a fluid-handling, tapered rotor and stator sleeve assembly mounted on a rotary shaft, in which one of the sleeves is cut with opposed bidirectional helical grooves. The grooves are configured in the inventive manner described below to control thrust, improve lubrication, and/or provide bidirectional operation.

In RAMSAY, there is described a bearing and/or seal assembly for a rotary pump drive shaft, based on the use of a tapered rotor and stator sleeve arrangement. One of the sleeves is cut with a continuous helical groove along which a barrier liquid is driven, by virtue of the rotation of the rotor sleeve, and pressurized, serving to drive the barrier liquid toward the process fluid being pumped. As described, the tapered sleeve arrangement serves as a bearing and also as a liquid barrier seal. In RAMSAY, however, as far as the bearing function is concerned, only a journal bearing capability was provided. The tapered rotor sleeve was allowed to float axially in the direction of the pump drive shaft. The axial or thrust location of the rotor sleeve and shaft was balanced by some external means, such as a thrust spring or separate ball-bearing.

In order to add a thrust bearing capability to the journal bearing function of the tapered sleeve arrangement described in RAMSAY, a back-to-back, double taper sleeve arrangement was devised as described in patent publication WO 97/13084 (RAMSAY II) published Apr. 10, 1997 (based on PCT/CA96/00659). As described in RAMSAY II, each of the sleeve tapers are provided with a continuous helical groove along which a barrier liquid is conducted.

Heretofore, cylindrical journal bearing units having cooperating rotor and stator sleeves were known in which one of the sleeves was formed with a continuous helical groove or with bidirectional helical grooves along which a lubricating liquid was conducted. These bearing units utilized hydrodynamic lubrication. In the case of the continuous groove, lubricant entered at one end of the groove and was conducted to the other end which was typically closed. In the case of bidirectional grooves, the sleeve contained a left hand revolving section and a right hand revolving section which spiraled toward one another at a midpoint. The lubricant traveled along these spiral grooves until arrival at the midpoint, which was either closed or provided with a suitable opening through the lubricant exited to provide a recycled lubrication flow. Representative of such helical groove journal bearings are U.S. Pat. No. 1,923,597, U.S. Pat. No. 4,462,644, and U.S. Pat. No. 4,614,445.

The inventors have recognized that it would be advantageous to control the thrust and adjust pressure conditions at either end of the taper for a tapered seal/bearing sleeve arrangement. The inventors have also recognized that it would be advantageous to provide for a mechanism by which thrust forces across the tapered sleeve can be balanced or controlled in one direction or the other, depending on the application requirements, for a simpler approach to stabilizing thrust on the rotary shaft.

SUMMARY OF THE INVENTION

For use as a bearing and/or seal assembly mounted on a rotary shaft, such as a rotary pump drive shaft, there is provided a pair of sleeves in the form of a rotor sleeve and a stator sleeve which together define a single taper bearing surface coaxially disposed about the axis of the shaft, and a pair of oppositely directed inclined grooves each extending along at least a portion of a helical or spiral path (bidirectional grooves) through which fluid, such as liquid, is conducted to an interior zone of the grooved sleeve, such that net thrust forces across the assembly are controlled. Pursuant to the invention, the opposing grooves are specially configured respective to one another.

One or both inclined grooves of the pair of inclined grooves can be a continuous helical or spiral groove or can be one inclined groove of a plurality of spaced-apart inclined grooves.

As between the grooves, the grooves may differ in length, pitch, depth, and/or width. The opposing grooves may not coincide at a common midpoint or apex interiorly of the sleeve. The turns of the grooves may differ. The interior ends of the opposing grooves may merge into one another or be separated from one another by a circumferential groove or land and thus be discontinuous and separate. The differences as between the grooves is predesigned to yield a balanced thrust operation during rotation of the shaft, or produce a negative or positive thrust in order to offset external thrust force and maintain stability of the shaft. When simultaneously used as a barrier liquid seal assembly, the groove differences serve to control liquid pressure flow across the assembly such that process fluid is prevented from passing backward through the bearing surface interface.

DETAILED DESCRIPTION OF THE INVENTION

While this invention is susceptible of embodiments in many different forms, there are shown in the drawings and will be described herein in detail specific embodiments thereof with the understanding that the present disclosure is to be considered as an exemplification of the principles of the invention and is not intended to limit the invention to the specific embodiments illustrated.

As a matter of background to description of the present invention, reference is made to RAMSAY, or its counterpart U.S. Pat. No. 5,827,042. These publications describe the design and operation of a single taper bearing/seal sleeve assembly comprising a stator component and a rotor component adapted for rotation about the axis of rotation of a rotary shaft, such as the drive shaft for a rotary pump. The rotor and stator components are formed with complimentary tapered bearing surfaces coaxially disposed about the axis of the shaft, so as to sweep each other in a hydrodynamic-bearing relationship, over an area termed the bearing area, upon rotation of the rotor. One of the bearing surfaces, such as the rotor component, is formed with a continuous helical groove which extends in a spiral configuration along and around the bearing surface, over the bearing area. The helical groove comprises several turns extending over the bearing surface, the arrangement thereof being such a to leave lands between adjacent turns of the helical groove. The assembly is so structured that the helical groove has an entry mouth and an exit mouth. The entry mouth is in communication with a fluid entry chamber which receives a barrier liquid from a source of barrier liquid. The exit mouth opens into a fluid discharge chamber into which the barrier liquid discharges, after having been taken in by the entry mouth, conducted along the length of the helical groove, and pressurized, upon rotation of the rotor. The discharge chamber may be in fluid communication with the process fluid of a rotary pump, such that the assembly serves to provide a liquid barrier seal against ingress of process fluid backward along the length of the shaft. The complimentary bearing surfaces are fitted together in a male-female configuration over the bearing area. Because of the single taper configuration, only a journal bearing capability is provided, and a means, such as in the form of a spring bias, is included for resiliently urging the bearing surfaces of the assembly together into the hydrodynamic-bearing, rubbing relationship.

Figure 1:
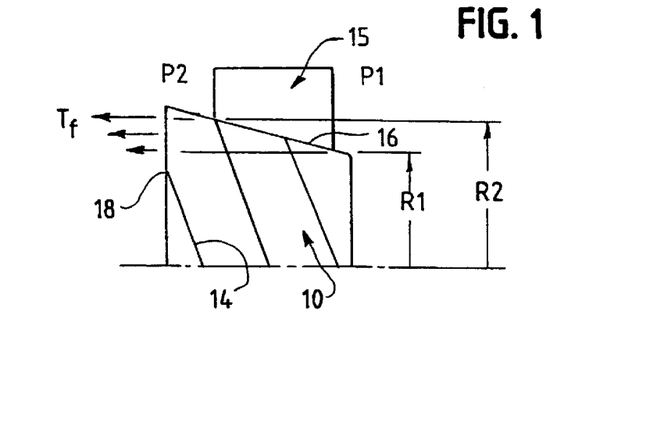
FIG. 1 is a schematic diagram illustrating the fluid thrust force generated on a single taper bearing/seal sleeve assembly having a unidirectional helical cut groove.

With this background in mind, reference is made to FIG. 1 which illustrates identification of the backward fluid pressure thrust produced on a single taper rotor component 10 having the unidirectional helical cut groove 14, and rotationally driven with respect to a stator component 15. The rotor 10 has a generally tapered outside surface 16. P2 represents the fluid pressure at the entry chamber, feeding the entry mouth 18 of the groove 14. P1 represents the fluid pressure in the discharge chamber of the assembly. The helical groove 14 wraps around the rotor's surface 16 in one direction. The rotating groove 14 generates a gradually increasing pressure in the liquid and a thin liquid hydrodynamic film between the rotor 10 and stator 15. The direction of this pressure increase depends on direction of rotation. This pressure acts on the different diameters of the tapered surface 16 to generate an axial thrust force, or film thrust Tf illustrated in FIG. 1 as backward toward the entry chamber.

Film thrust Tf is equal to Pressure×Area, wherein pressure equals $\pm(P2-P1)$ and area equals $n \times (R2^2-R1^2)$, where R1 is the smaller radius of the rotor/stator interface, and R2 is the larger radius of the rotor/stator interface. This force-must be balanced by some external means, such as the above-described spring bias.

In order to afford the single sleeve assembly with a thrust bearing capability, and to do so without increasing equipment space and materials, such as occurs in the double taper approach described in RAMSAY II, it has been inventively contemplated to provide for offsetting film pressure thrusts in the bearing area, between the rotor and stator, with the use of opposed, bidirectional helical or inclined cut grooves in one of the bearing surfaces.

Figure 2:
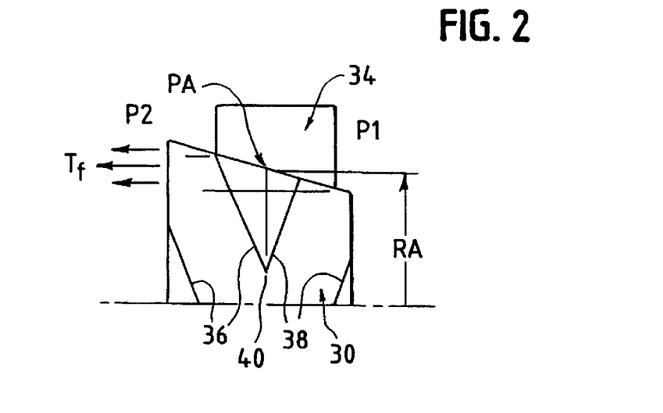
FIG. 2 is a schematic diagram illustrating the fluid thrust force acting on a single taper bearing/seal sleeve assembly having bidirectional helical cut grooves joining at a common apex.
Figure 3:
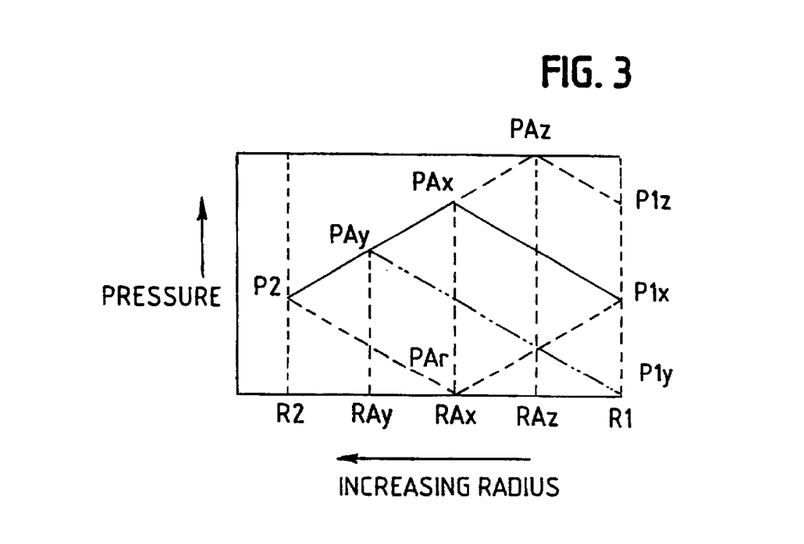
FIG. 3 is a graphical table showing the impact of three apex locations, in the assembly of FIG. 2, on taper pressure distributions.
Figure 4:
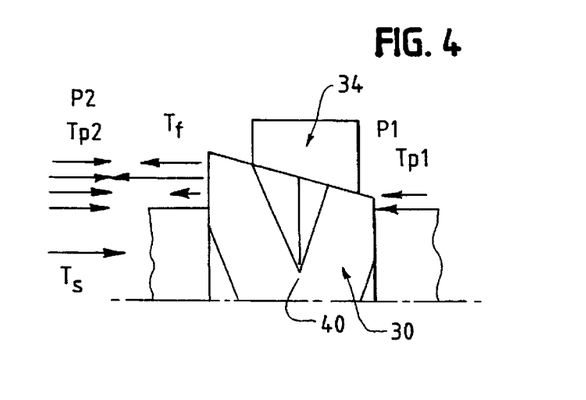
FIG. 4 is a schematic diagram illustrating how, following from FIG. 3, the apex location, in the assembly of FIG. 2, can be selected to provide a constant, positive, negative, or zero thrust acting on the rotor assembly of FIG. 2.

For describing the design principles of the invention, reference is made to FIGS. 2, 3, and 4. As shown in FIG. 2, a single taper rotor 30 is rotatable with respect to a stator 34. The rotor 30 is formed with bidirectional helical cut grooves, including a left hand spiral groove 36, for conducting barrier liquid inwardly along the length of the rotor from the entry chamber, and a right hand spiral groove 38, for conducting process fluid inward along the length of the rotor from the discharge chamber. The grooves 36, 38 extend toward one another and meet at an interior point along the length of the rotor, called the apex 40. The position of the apex 40 controls the magnitude of the apex pressure PA with respect to the boundary pressures P1 and P2.

The apex radius RA is between R1 and R2 (see FIG. 1). The apex pressure has the relationship: PA>P1 & P2, or for reverse rotation, PA<P1 & P2.

Liquid film pressures, and thus thrust forces, are generated in the bearing area on each side of the apex 40. Since the apex 40 can be placed at any location within the bearing area, one of the boundary pressures and the net film thrust forces can be varied. FIG. 3 shows the impact of-three apex locations on boundary pressures and pressure distributions.

FIG. 3 illustrates example pressure distributions. Four cases are charted:

case x: P2=P1, case y: P2>P1, case z: P2<P1, case r: case x, reverse isolation.

Thus, by applying bidirectional helical cut grooves to the bearing surface of a single taper bearing/seal sleeve assembly, one variable that may be used to maintain a constant or zero net thrust on the rotor component, independent of boundary pressure, is optimization of the apex location.

As shown in FIG. 4, the external thrust forces, the thrust due to the respective pressure P1 and P2, indicated as Tp1 and Tp2, respectively and the thrust Ts due to shaft thrust, on the rotor may be balanced by the fluid pressure thrust Tf produced in the bearing area, effected by the apex location. The selection of a constant positive, negative, or zero thrust depends on the application requirements. In FIG. 4 the apex is located between R1 and R2 (see FIG. 1) such that net thrust is controlled to a constant valve: the valve can be <0, =0, or >0.

Figure 5:
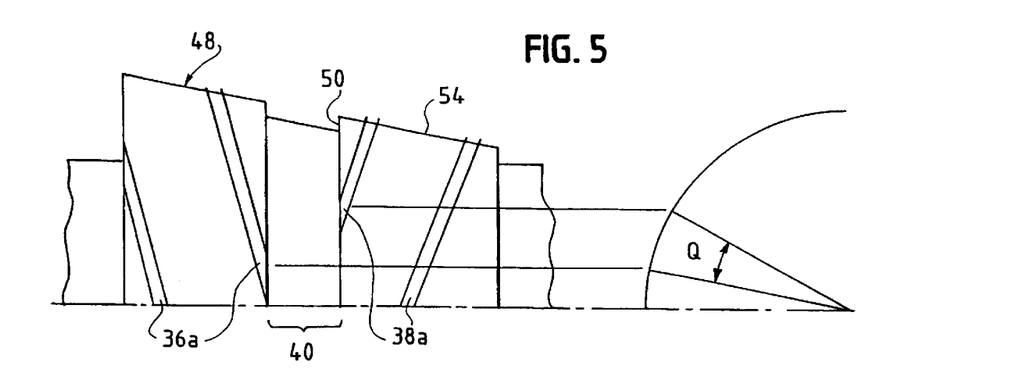
FIG. 5 is a schematic diagram illustrating a single taper rotor sleeve, for a bearing/seal sleeve assembly, having bidirectional helical cut grooves of comparable geometry, but angularly offset from one another so as to terminate at different points along an optional apex groove.

FIG. 5 illustrates a rotor 48 having a circumferential groove 50 located at the apex region 40 along the length of the bidirectional grooved bearing surface 54. The circumferential groove provides an increased stability. Alternately, a circumferential land (not shown in FIG. 11) can be located at this apex region for the purpose of increasing load carrying capability. The circumferential groove 50 could provide an exit point for vapor or provide an entry/exit for lubricant flow. This groove could be located in a rotor 48 as shown, and/or a corresponding stator (not shown). Practically, the circumferential groove 50 would be located in the grooved component, usually the rotor, to simplify manufacture, as shown in FIG. 5.

Also, as shown in FIG. 5, another design parameter which can be varied to control fluid pressure thrust on the bearing surface, for the purpose of off-setting external thrust forces, is to make different the commencement of the opposing bidirectional grooves 36a, 38a such that they do not coincide at a common apex. The grooves can be offset by some angular position Q around the taper, as shown in FIG. 5, to optimize pressure distributions and smooth pressure pulses.

Figure 6:
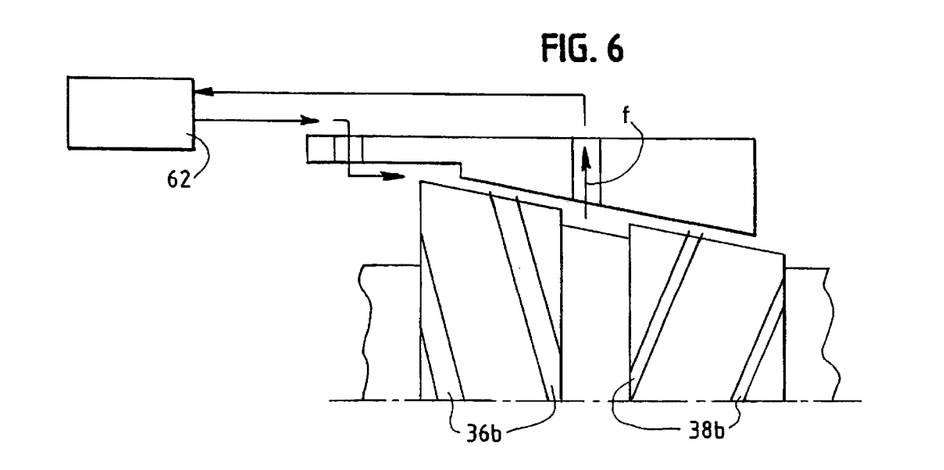
FIG. 6 is a schematic diagram illustrating a single taper rotor sleeve, for a bearing/seal assembly, having bidirectional helical cut grooves of nonsymmetric geometry, and utilizing an apex groove and central opening for recycled lubrication flow.

Still further, the relative geometries or configurations of the opposed grooves, e.g., depth, width, pitch, and quantity, need not be symmetric and may be relatively varied to control pressure distributions and optimize the offset thrust. FIG. 6 illustrates one such example wherein the left hand spiral groove 36b is of a width greater than the right hand spiral groove 38b, such that the flow capacity through the left hand spiral groove is greater. The excess pressure and/or flow generated by the left hand spiral groove 36b could also be used for fluid circulation, as shown in FIG. 6. A liquid lubricant flow f, with recycling and cooling by a cooler 62 could be so established for the assembly.

Figure 7:
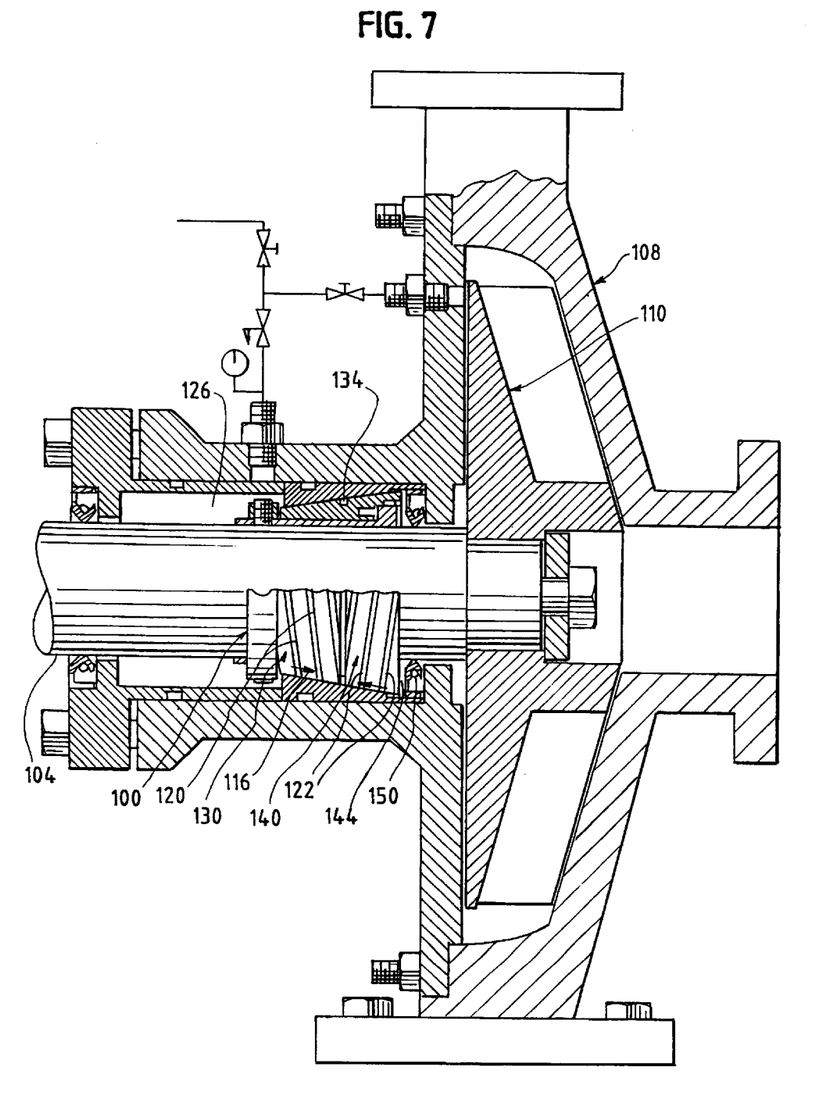
FIG. 7 is a cross-sectional side elevational view of a single taper bearing/seal sleeve assembly having bidirectional helical cut grooves, in use along the drive shaft for a rotary pump.

In FIG. 7, there is shown a preferred application of this invention as a bearing/seal assembly 100 about a drive shaft 104 for a rotary pump 108 and located immediately behind the pump impeller 110. The assembly 100 is a single taper sleeve assembly that includes a rotor component 116 which is formed with bidirectional helical grooves 120, 122 for conducting liquid from opposed ends of the rotor toward the bearing area, interior of the rotor. Applying the lexicon from the description in RAMSAY, the single taper cartridge sleeve assembly 100 causes barrier liquid to be drawn in at an entry chamber 126 and then pumped through the groove 120 along the length of a tapered surface 130 for discharge under pressure at a circumferential apex groove 134. Along taper section 140 the helical groove 122 draws process fluid in from the discharge chamber 144 toward the apex chamber 134.

The apex location may be adjusted so as to not be at the point along the rotor taper and/or the opposed helical grooves may be angularly offset and/or the geometry or configuration of the opposed grooves may be different. These specialized design features are selected to produce an-optimized fluid pressure thrust on the rotor component in the bearing area which provides balance against external thrust such that the rotor component maintains a stable axial position during operation. A lip seal 150 is provided only for sealing the process fluid during shutdown of the pump. Otherwise, the direction of barrier liquid flow is across the rotor in the direction of the pump impeller, and provides a liquid barrier seal.

It is contemplated that the single taper sleeve assembly could be utilized simply as a journal and thrust bearing for a rotary shaft. In addition, the single taper sleeve assembly of the present invention could be utilized as a component of a journal and thrust bearing package comprised of multiple single taper sleeve assemblies. Shown in FIG. 8 is a double radial/thrust taper bearing 200 in which two opposed single taper sleeve assemblies 204, 206 are provided, each operating with opposed bidirectional helical grooves 210a, 212a; 210b, 212b, formed in the respective rotor components 204, 206.

Figure 8:
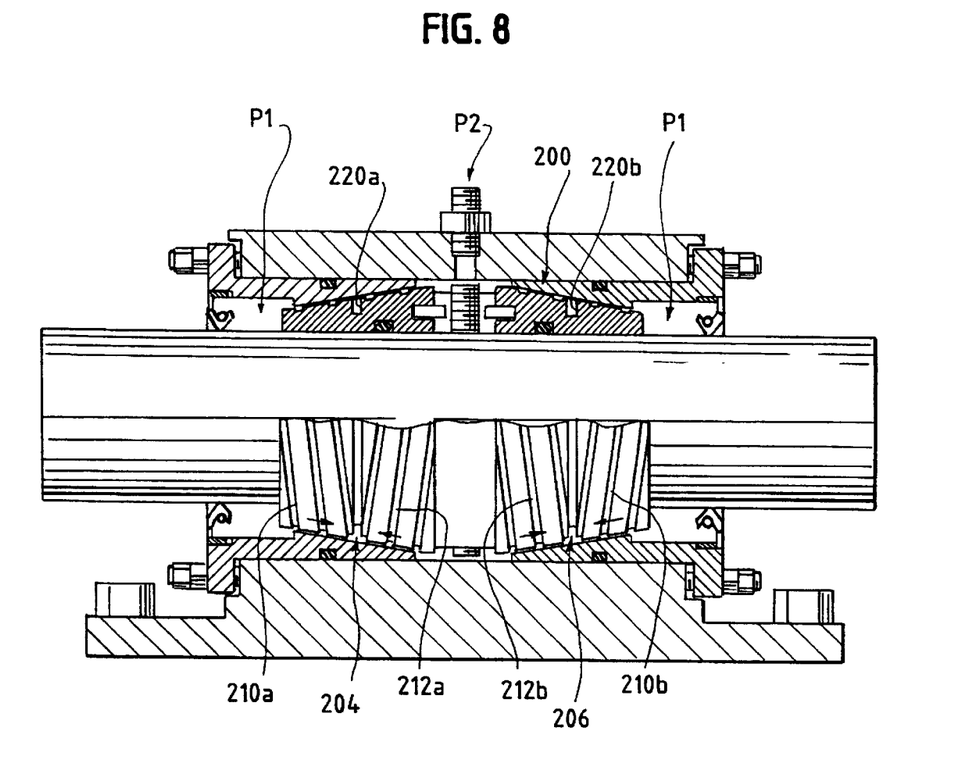
FIG. 8 is a cross-sectional, side elevational view of an opposed pair of single taper bearing/seal sleeve assemblies, each having bidirectional helical cut grooves.

As exemplified in FIG. 8, the opposed ends of each rotor component would be exposed to a common pressure P1, such as ambient pressure (0 PSI), and the groove pairs 210a, 212a and 210b, 212b terminate interiorly of the rotor taper at a common apex groove 220a, 220b respectively. The mirror image configuration of the double single taper sleeve assemblies assure a uniform balance, and uniform wear. Typical pressures at P1 and P2 could be 0 PSI and, at points within the grooves 220a, 220b could be 100 PSI.

Figure 9:
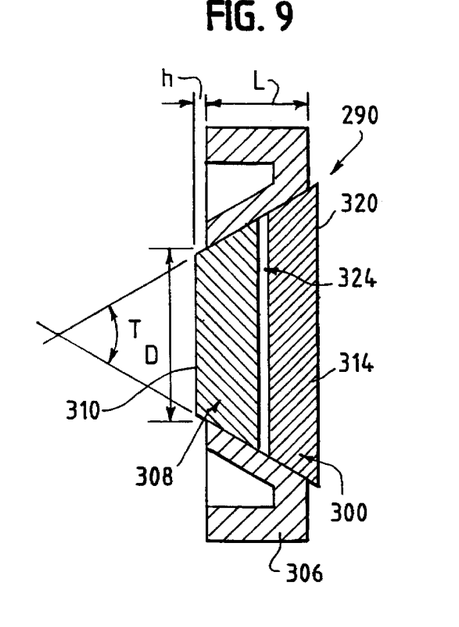
FIG. 9 is a schematic diagram of an alternate embodiment single taper bearing/seal sleeve assembly having bidirectional inclined grooves.

FIG. 9 illustrates an exemplary embodiment seal/bearing assembly 290 including a rotor 300 carried on a shaft (not shown) at least partially within a stator 306. The rotor 300 includes an included angle of taper T of about 60° which provides effective design for a high thrust and radial load application. The opposed flow geometry allows for steep angles. Although 60° is exemplary, other angles of taper are encompassed by the invention, between a practical minimum of about 15° to a possible maximum of nearly 180°.

The rotor/stator interface has a length L of about 1.125 inches. The rotor overhangs the stator at the ends 310, 320 by a distance h of about 0.13 inches. The rotor/stator interface has a smaller end diameter D of about 1.875 inches.

The rotor 300 includes nine (9) inclined grooves 308 at about 0.62 threads per inch (tpi) pitch which are located adjacent to a smaller end 310 of the taper, and twelve (12) inclined grooves 314 at about a 0.47 tpi pitch adjacent to a larger end 320 of the taper. The grooves 308, 314 are substantially rectangular in cross section and are all about 0.1 inches wide and about 0.0015 inches deep. The grooves 308, 314 can be less than 2 cm long. The inclined grooves 308, 314 extend along portions of spiral paths.

The grooves 308 have open ends or mouths at the smaller end 310 and open ends or mouths at an apex rotor groove 324. The grooves 314 have open ends or mouths at a larger end 320 and open ends or mouths at the apex rotor groove 324.

The multiple short and shallow grooves 308, 314 provide increased bearing capacity at the expense of generating fluid pressure compared with single helical grooves such as shown in FIG. 2. The quantity and asymmetry allows this rotor to develop a stiff lubricating film and to be substantially hydraulically neutral, this is, having a pressure of nearly zero psi at both ends and a pressure of about 5 to 10 psi in the apex rotor groove 324.

Figure 10:
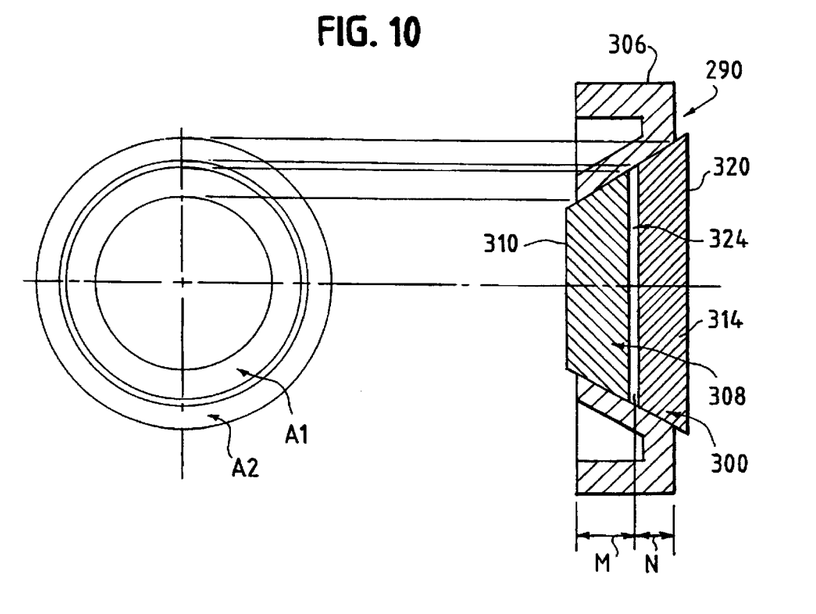
FIG. 10 is a diagrammatic view of the bearing/seal assembly of FIG. 9, illustrating axially projected areas of interface between the rotor sleeve and stator sleeve.

As illustrated in FIG. 10, the apex rotor groove 324 is not necessarily equidistant from the ends 310, 320, i.e., N not equal to M. This asymmetry is effective to balance the pressure potential on the opposing sides of the apex groove 324. In this regard, an axially projected annular area A1 between the small end 310 and the apex groove 324 and an axially projected annular area A2 between the large end 320 and the apex groove 324 are set equal.

Figure 11:
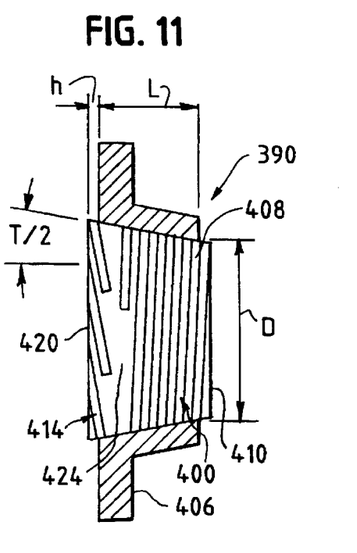
FIG. 11 is a schematic diagram of a further alternate embodiment single taper bearing/seal sleeve assembly having bidirectional inclined grooves and a spiral groove.

FIG. 11 illustrates a further exemplary seal/bearing assembly 390 having a rotor 400 carried on a shaft (not shown) at least partially within a stator 406. In this embodiment, the included angle of taper T is about 20°. For simplicity only one half the angle, T/2, (taken from a line parallel to the rotor central axis) is illustrated. This embodiment is particularly adapted for a low thrust load.

The rotor/stator interface has a length L of about 1.125 inches. The rotor 400 overhangs the stator at both ends by a distance h of about 0.13 inches. The rotor/stator interface has a smaller end diameter D of about 1.997 inches.

The rotor 400 includes a spiral groove 408 adjacent to a small end 410, and plural inclined grooves 414 adjacent to a large end 420. The inclined grooves extend along portions of spiral paths. The spiral groove 408 has a 5 tpi left hand pitch. The plural inclined grooves 414 comprise five (5) equidistantly spaced grooves at a 1 tpi right hand pitch. The grooves 408, 414 are substantially rectangular in cross section and are about 0.1 inches wide and 0.010 inches deep. The spiral groove 408 has an open mouth at the small end 410. The inclined grooves 414 have open mouths at the large end 420. Unlike the prior embodiment rotor 300, however, the groove 408 and plural grooves 414 have closed ends at their inner most position.

The grooves 414 quickly force-feed lubricant into the land area 424. The groove 408 takes some time to "pump up", to generate pressure. The force-feeding by the short multiple inclined grooves 414 improves bearing lubrication when the shaft is first started to rotate. The grooves 408, 414 are close to each other a the apex land area 424 but do not touch. This arrangement helps to contain pressure pumped up by the single groove 408.

Figure 12A:
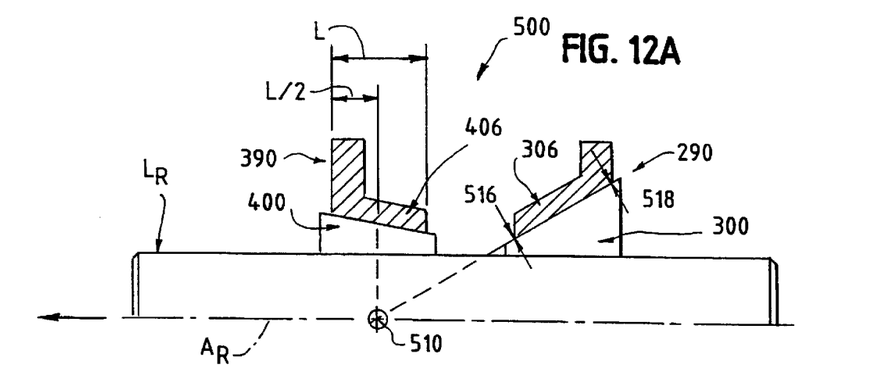
FIG. 12A is a diagrammatic view of a dual bearing/seal assembly on a shaft according to the present invention, wherein an imposed radial load is at an end of the shaft.

FIG. 12A illustrates as an example, an assembly 500 which utilized both of the assemblies 290, 390 previously described, as a radial and radial/axial bearing pair. The rotor 400 provides an effective "pivot point" 510 when a radial load Lr is located to the left of the rotor 400, and the rotor 300 is to the right of the rotor 400, as shown in the FIGURE.

Figure 12B:
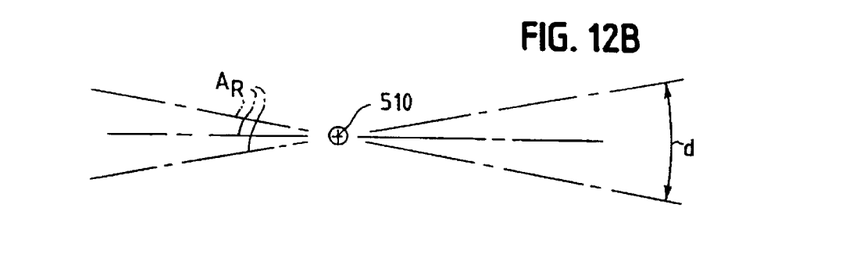
FIG. 12B is a diagram of the relative movement of the shaft of FIG. 12A.

The effective pivot point 510 is located at the intersection of the axis of rotation Ar and the dashed line indicated the mid length L/2 of the rotor/stator interface, the interface having the overall length L. According to an effective design, the apex of the inclined angle of taper T of the rotor 300 coincides with the pivot point 510. For the indicated rotor pair 300, 400, when the shaft deflects in a substantially vertical direction d (shown exaggerated) about the effective pivot points 510, as shown in FIG. 12B, the gap or clearance, i.e., the liquid film thickness, between the rotor 300 and the stator 306 varies more uniformly along the tapered interface. The film thickness at 516 is maintained substantially equal to the film thickness at 518. This uniformity helps to maintain the pressure and lubricant film characteristics defined by the groove geometries.

Figures 13A, 13B:
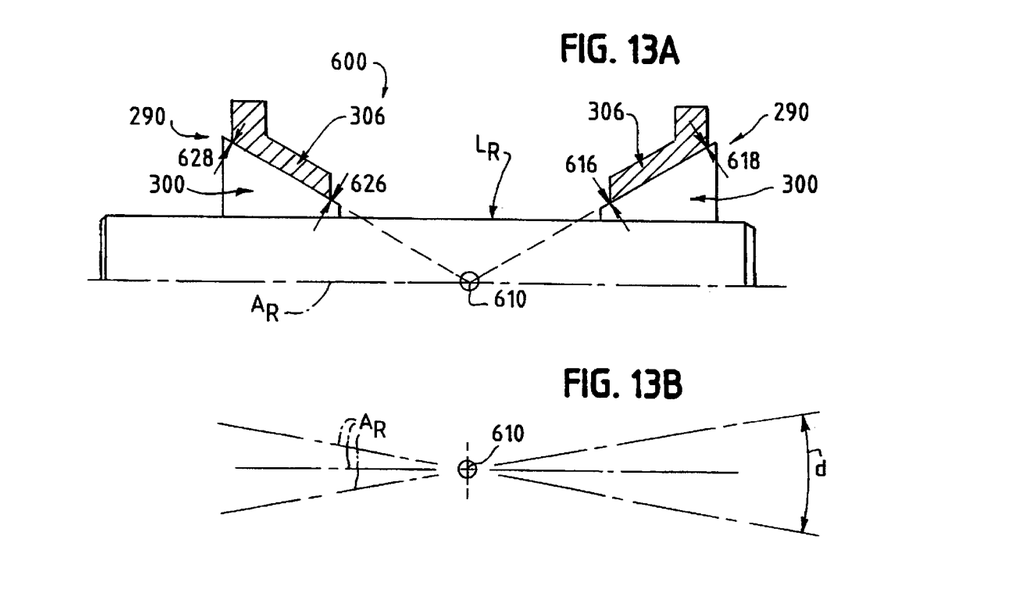
FIG. 13A is a diagrammatic view of a dual bearing/seal assembly on a shaft according to the present invention, wherein an imposed radial load is located in a central area of the shaft, between the bearing/seal assemblies.
FIG. 13B is a diagram of the relative movement of the shaft of FIG. 13A.

FIG. 13A illustrates another exemplary assembly 600 using two assemblies 290 in mirror image arrangement. In this embodiment a radial load Lr is located between the two assemblies 290. The effective pivot point 610 is between the two assemblies 290. The apices of the inclined angles of taper T of the two assemblies intersect at the effective pivot point 610. Although two identical assembies 290 are used as an example, one of the assemblies could be different, such as the assembly 390, having a different angle of taper T wherein the two assemblies are set at a preselected distance apart wherein the apices of the different projected angles of taper T are set to coincide at a pivot point which is not at a midpoint between the two assemblies.

As illustrated in FIG. 13B the shaft axis of rotation Ar pivots about the pivot point 610. The shaft pivoting movement results in a vertical direction d (shown exaggerated). The film thickness at 616 remains substantially equal to the film thickness at 618, and the film thickness at 626 remains substantially equal to the film thickness at 628.

From the foregoing, it will be observed that numerous variations and modifications may be effected without departing from the spirit and scope of the invention. It is to be understood that no limitation with respect to the specific apparatus illustrated herein is intended or should be inferred. For example, the single taper sleeve assembly of the present invention, having bidirectional inclined or helical grooves formed in one of the rotor and stator sleeve bearing components may be utilized simply as a bearing, in which case the fluid flow being conducted along the grooves may be a lubrication liquid. In other instances, the single taper sleeve assembly may be utilized as both a barrier liquid seal and journal and thrust bearing device. The application of the design principles of the invention are not dependant on the direction of rotation of the rotor sleeve.

We claim:

1. Apparatus for a rotating shaft including a pair of sleeves comprising a stator sleeve and a rotor sleeve adapted for rotation about the axis of rotation of the shaft which together define a complementary surface-to-surface interface between them, the interface being of a tapered configuration, the apparatus having a prearranged quality of controlled thrust, wherein:

the interface surface of one of the rotor and stator sleeves is formed with a first inclined groove which extends along at least a portion of a spiral path and a second inclined groove which extends along at least a portion of a spiral path, said first and second inclined grooves being opposed and oppositely directed and are configured differently with respect to one another;

each inclined groove having an end mouth relative to the sleeve, the end mouth being in fluid-communication with a respective source of liquid;

the inclined grooves being arranged such as to define lands on opposite sides of each of the grooves, the lands being of such dimensions and configuration as to support a hydrodynamic film of liquid at the interface between the stator and rotor sleeves;

a second pair of rotor and stator sleeves which together define a complementary surface-to-surface interface between them, the interface being of a tapered configuration, and wherein the interface surface of one of the rotor and stator sleeves of said second pair is formed with a pair of opposed and oppositely directed inclined grooves of said second pair having an end mouth relative to the sleeve, the end mouth of each of the inclined grooves of said second pair being in fluid-communication with a respective source of liquid, the inclined grooves of said second pair being arranged such as to define lands on opposite sides of each of the grooves, the lands being of such dimensions and configuration as to support a hydrodynamic film of liquid at the interface between the stator and rotor sleeves, and the pairs of sleeves arranged in the apparatus with their tapered interfaces in a coaxial, end-to-end relative configuration, and wherein said interface of said second pair of sleeves has an axial length taken along the shaft, and the intersection of a half-length plane of the axial length of said interface with a centerline of the shaft defines a theoretical pivot point, and said rotor sleeve/stator sleeve interface of said first pair of sleeves has an included angle of taper, and said first and second pair of sleeves are axially positioned such that a projection of said included angle of taper to an apex coincides with said theoretical pivot point.

2. Apparatus for a rotating shaft including a pair of sleeves comprising a stator sleeve and a rotor sleeve adapted for rotation about the axis of rotation of the shaft which together define a complementary surface-to-surface interface between them, the interface being of a tapered configuration, the apparatus having a prearranged quality of controlled thrust, wherein:

the interface surface of one of the rotor and stator sleeves is formed with a first inclined groove which extends along at least a portion of a spiral path and a second inclined groove which extends along at least a portion of a spiral path, said first and second inclined grooves being opposed and oppositely directed and are configured differently with respect to one another;

each inclined groove having an end mouth relative to the sleeve, the end mouth being in fluid-communication with a respective source of liquid;

the inclined grooves being arranged such as to define lands on opposite sides of each of the grooves, the lands being of such dimensions and configuration as to support a hydrodynamic film of liquid at the interface between the stator and rotor sleeves;

a second pair of rotor and stator sleeves which together define a complementary surface-to-surface interface between them, the interface being of a tapered configuration, and wherein the interface surface of one of the rotor and stator sleeves is formed with a pair of opposed and oppositely directed inclined grooves, each inclined groove of said second pair having an end mouth relative to the sleeve, the end mouth of each of the inclined grooves being in fluid-communication with a respective source of liquid, the inclined grooves of said second pair being arranged such as to define lands on opposite sides of each of the grooves, the lands being of such dimensions and configuration as to support a hydrodynamic film of liquid at the interface between the stator and rotor sleeves, and the pairs of sleeves arranged in the apparatus with their tapered interfaces in a coaxial, end-to-end relative configuration;

and said rotor sleeve of said first pair of sleeves comprises an included angle of taper of about 60° and said rotor sleeve of said second pair of sleeves comprises an included angle of taper of about 20°.

3. Apparatus for a rotating shaft including a pair of sleeves comprising a stator sleeve and a rotor sleeve adapted for rotation about the axis of rotation of the shaft which together define a complementary surface-to-surface interface between them, the interface being of a tapered configuration, the apparatus having a prearranged quality of controlled thrust, wherein:

the interface surface of one of the rotor and stator sleeves is formed with a first inclined groove which extends along at least a portion of a spiral path and a second inclined groove which extends along at least a portion of a spiral path, said first and second inclined grooves being opposed and oppositely directed and are configured differently with respect to one another;

each inclined groove having an end mouth relative to the sleeve, the end mouth being in fluid-communication with a respective source of liquid;

the inclined grooves being arranged such as to define lands on opposite sides of each of the grooves, the lands being of such dimensions and configuration as to support a hydrodynamic film of liquid at the interface between the stator and rotor sleeves, and wherein said rotor sleeve comprises an included angle of taper of about 60°.

4. Apparatus for a rotating shaft including a pair of sleeves comprising a stator sleeve and a rotor sleeve adapted for rotation about the axis of rotation of the shaft which together define a complementary surface-to-surface interface between them, the interface being of a tapered configuration, the apparatus having a prearranged quality of controlled thrust, wherein:

the interface surface of one of the rotor and stator sleeves is formed with a first inclined groove which extends along at least a portion of a spiral path and a second inclined groove which extends along at least a portion of a spiral path, said first and second inclined grooves being opposed and oppositely directed and are configured differently with respect to one another;

each inclined groove having an end mouth relative to the sleeve, the end mouth being in fluid-communication with a respective source of liquid;

the inclined grooves being arranged such as to define lands on opposite sides of each of the grooves, the lands being of such dimensions and configuration as to support a hydrodynamic film of liquid at the interface between the stator and rotor sleeves, a second pair of rotor and stator sleeves which together define a complementary surface-to-surface interface between them, the interface being of a tapered configuration, and wherein the interface surface of one of the rotor and stator sleeves of said second pair is formed with a pair of opposed and oppositely directed inclined grooves, each inclined groove of said second pair having an end mouth relative to the sleeve, the end mouth of each of the inclined grooves of said second pair being in fluid-communication with a respective source of liquid, the inclined grooves of said second pair being arranged such as to define lands on opposite sides of each of the grooves, the lands being of such dimensions and configuration as to support a hydrodynamic film of liquid at the interface between the stator and rotor sleeves, and the pairs of sleeves arranged in the apparatus with their tapered interfaces in a coaxial, end-to-end relative configuration, and wherein a theoretical shaft pivot point is defined at a point between said first and second pairs of sleeves, and each of said interfaces of said pairs of sleeves defines an included angle of taper, apices of said included angles of taper of said interfaces being coincident with the theoretical shaft pivot point.

* * * * *